J. G. WEAVER, Jr.
MANUFACTURE OF CAST PIPE ELBOWS.

No. 104,908. Patented June 28, 1870

J. G. WEAVER, Jr.
MANUFACTURE OF CAST PIPE ELBOWS.
No. 104,908. Patented June 28, 1870.
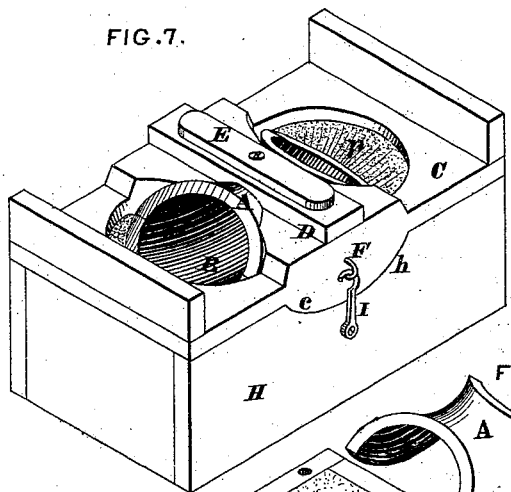
FIG. 7.
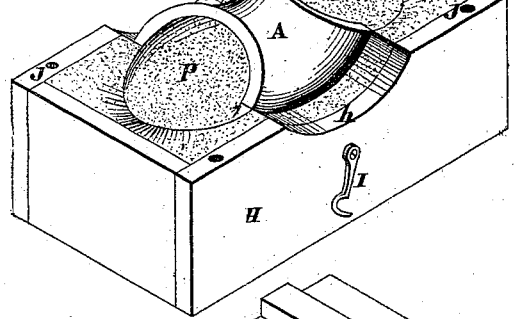
FIG. 8.
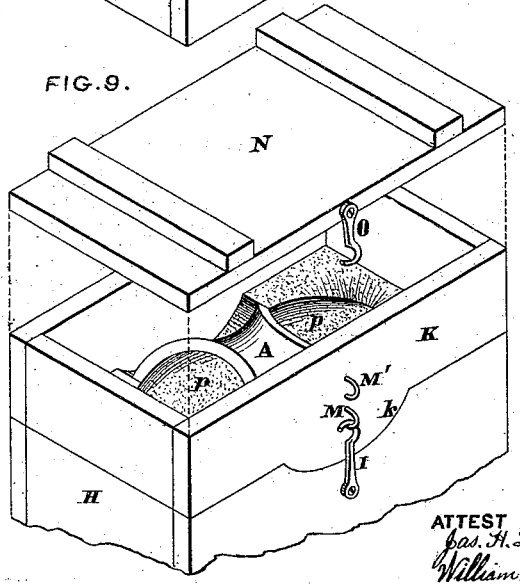
FIG. 9.
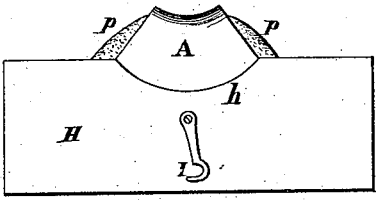
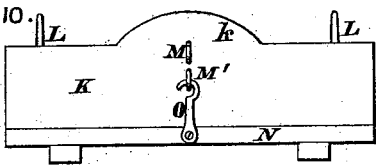
FIG. 10.
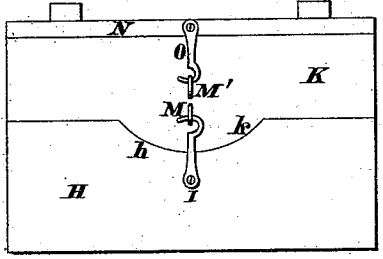
FIG. 11.
FIG. 12.
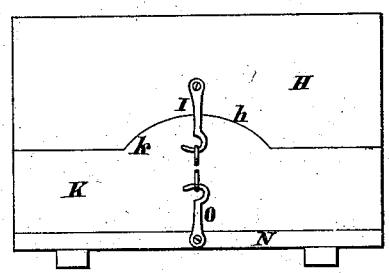
FIG. 13.
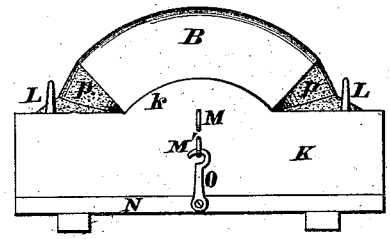
FIG. 14.
FIG. 15.
ATTEST
Jas. H. Layman.
William Brull.
Knight Bros.
Attys for Weaver 3 Sheets—Sheet 3.

J. G. WEAVER, Jr.
MANUFACTURE OF CAST PIPE ELBOWS.

No. 104,908.  Patented June 28, 1870.

Knight Bros
attys for Weaver

United States Patent Office.

JOHN G. WEAVER, JR., OF CINCINNATI, OHIO.

Letters Patent No. 104,908, dated June 28, 1870.

IMPROVEMENT IN THE MANUFACTURE OF CAST PIPE-ELBOWS.

The Schedule referred to in these Letters Patent and making part of the same.

I, JOHN G. WEAVER, Jr., of Cincinnati, Hamilton county, Ohio, have invented a new and improved Manufacture of Cast Pipe-Elbows, of which the following is a specification.

Nature and Objects of the Invention.

My invention relates to a mode of manufacturing pipe-elbows of cast metal, which, by dispensing with a separately prepared core, enables their production at a reduced cost.

General Description with Reference to the Drawing.

Figure 7 represents the same with the button on the follow-board turned back, and the heads removed for the purpose of ramming the green sand-core.

Figure 8 is a perspective view of the cope after the follow-board has been removed, the core having been previously rammed within the pattern with a parting at each end.

Figure 9 represents the cope in the same condition as shown in fig. 8, with the drag attached, ready for the third ramming.

Figure 10 is a side elevation of the drag and cope after first lifting, the drag having been previously rammed, and both parts or the pattern left in the cope.

Figure 11 is a perspective representation of the smaller part of pattern after being lifted off of the core and cope.

Figure 12 is a side elevation, showing the drag and cope united after the smaller part of pattern has been removed.

Figure 13 is a side elevation of the flask placed in an inverted position to that shown in fig. 12, for the purpose of allowing the cope to be lifted.

Figure 14 is a side elevation of the drag and bottom-board after the cope has been lifted, the large part of pattern remaining on the core in its position in the drag.

Figure 15 represents the large part of pattern lifted from the core in the drag.

A and B represent, respectively, the smaller and the larger part or member of a pattern of the desired elbow, the parting or joint of which is a cylindrical arc, concentric with the inner and outer curves of the elbow, and midway between them.

C is a follow-board, with curved points c, corresponding with the parting of the pattern. The follow-board has also a bridge, D, to whose outer side is pivoted a button, E. The said follow-board is also provided with two or more eyes, F, for attachment of the cope.

G G' are two heads or stoppers, by which the pattern is closed during the ramming of the cope.

H is a cope, having curved partings h, to correspond with the parting of the pattern, hooks I, for engagement, first, with the eyes of the follow-board, and afterward with those of the drag, and customary orifices J, to receive the dowels of the drag.

K is a drag, having a convex parting, k, to correspond with the parting of the pattern, dowels L, to enter the orifices J in the cope, and staples M M', to receive the hooks of cope, and of the bottom-board N.

O is a hook, by which the bottom-board N is connected to the drag K.

Operation.

Figure 1:
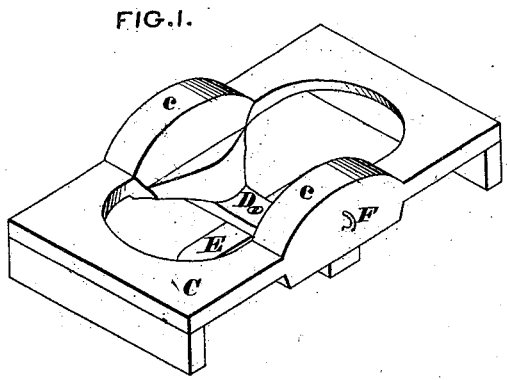
Figure 1 is a perspective view of the follow-board, with its button turned in such a position as to sustain the "heads."
Figure 2:
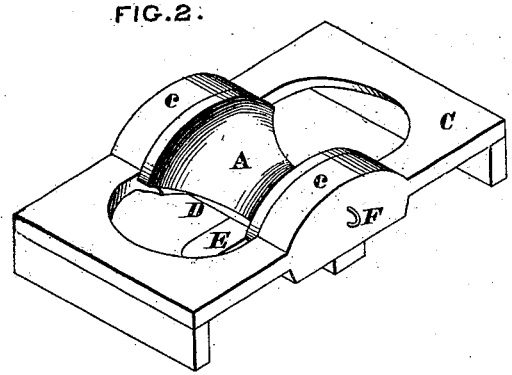
Figure 2 is a similar view of the said board with the small part of the pattern in position.
Figure 3:
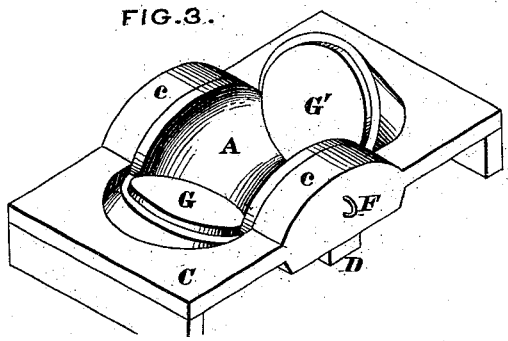
Figure 3 represents the same parts with the "heads" in position.

The button E having been turned so as to be longitudinal with the follow-board, as in fig. 1, the part A of the pattern is laid therein, as in fig. 2, and then the heads G G' are placed in position, as in fig. 3, being supported upon button E.

Figure 4:
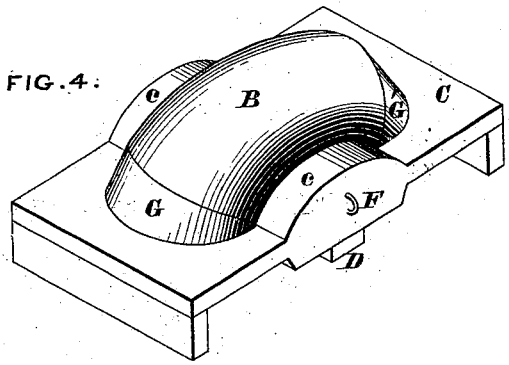
Figure 4 shows the same with the complete pattern in position upon the follow-board.
Figure 5:
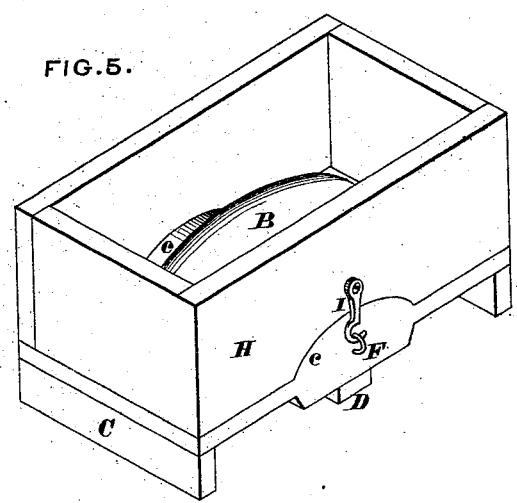
Figure 5 shows the same parts with the cope in position for the first ramming and the insertion of the gate.
Figure 6:
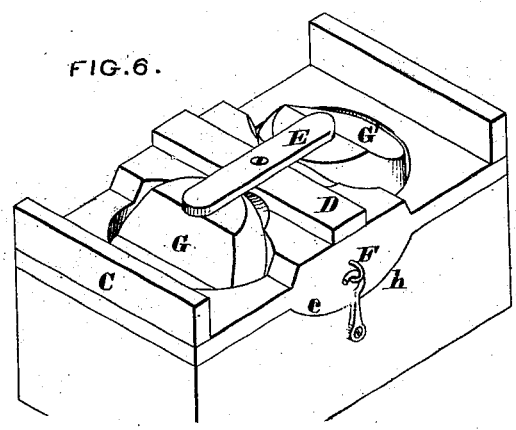
Figure 6 represents the follow-board and cope in an inverted condition after the latter has been rammed.

The large part B of the pattern is now placed in position, as in fig. 4, and this is followed by placing the cope H, as in fig. 5, which cope, being affixed to the follow-board by means of the hooks I, and "rammed" and "gated," the whole is inverted, as in fig. 6.

The button E being turned back, the heads G G' are removed, as in fig. 7, and the interior of the pattern rammed and brought to a suitable parting finish, as at p, figs. 7, 8, 9, 10, and 14.

The drag K being now placed upon the cope, as in fig. 9, and rammed, the bottom board N is hooked fast to said drag, and the latter is unhooked from and lifted off of the cope, leaving the pattern therein, as in fig. 10.

The small part of the pattern being then removed, (see A, fig. 11,) the drag is restored to the cope, as in fig. 12, and the entire flask being inverted, as in fig.

13, the cope is unhooked and lifted from the drag, so as to leave the latter in the condition shown in fig. 14, and the large part of the pattern is then lifted therefrom, (see B, fig. 15.)

Figure 16:
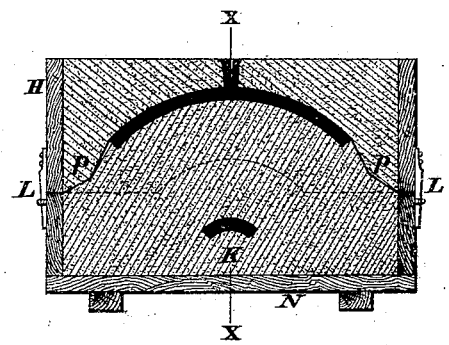
Figure 16 is a longitudinal section of the entire flask in condition for pouring the metal.
Figure 17:
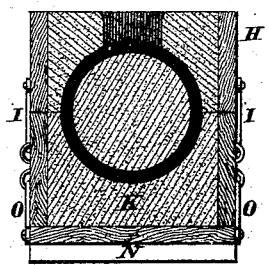
Figure 17 is a transverse section of the same at the line X X.
Figure 18:
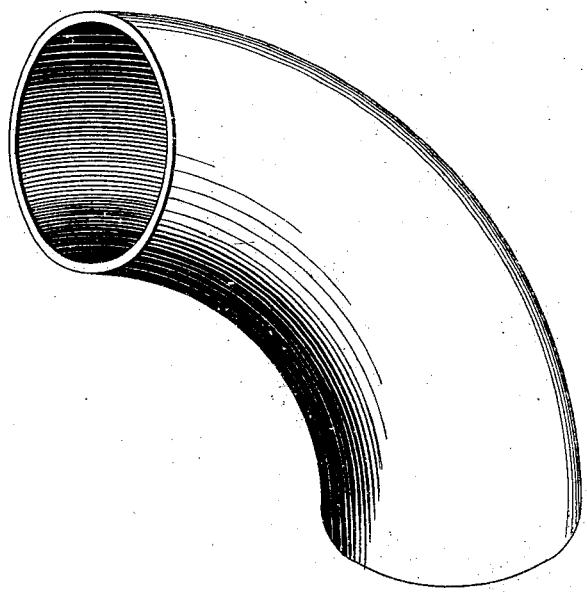
Figure 18 is a perspective view of the cast elbow on an enlarged scale.

The cope is then restored to the drag, leaving the flask fully rammed and ready for the operation of casting, (see figs. 16 and 17.)

Customary eyes and side pins may be used instead of the orifices and dowels.

In molding of large elbows, there may, when desired, be provided a supporting-bar in the center of the described green sand-core.

Elbows made on this plan may be either plain, as in the present illustration, or be furnished with beads and sockets on the ends, to adapt them for steam, gas, water, and other purposes.

By the above means I am enabled to make a pipe-elbow by casting the same in a mold constructed of ordinary molding-sand, thus superceding the necessity of a previously-prepared core, with its necessary and objectionable accompaniments of core-box, oven, and laborious placing and adjustment in the mold.

Claim.

I claim as new and of my invention—

The green sand-core and mold of the same material, as and for the purpose described.

In testimony of which invention I hereunto set my hand.

JOHN G. WEAVER, Jr.

Witnesses:
GEO. H. KNIGHT,
JAMES H. LAYMAN.